United States Patent [19]

Moriya et al.

[11] Patent Number: 4,482,928
[45] Date of Patent: Nov. 13, 1984

[54] TRACKING CONTROL SYSTEM FOR MAGNETIC RECORDING AND REPRODUCING SYSTEM

[75] Inventors: Ryusuke Moriya; Takeo Eguchi, both of Hadano; Takeo Ohba, Sagamihara, all of Japan

[73] Assignee: Sony Corporation, Tokyo, Japan

[21] Appl. No.: 517,047

[22] Filed: Jul. 27, 1983

Related U.S. Application Data

[63] Continuation of Ser. No. 261,445, May 7, 1981.

[30] Foreign Application Priority Data

May 10, 1980 [JP] Japan ................... 55-61887

[51] Int. Cl.³ .............. G11B 21/10; G11B 15/02; G11B 5/52
[52] U.S. Cl. ....................... 360/77; 360/21; 360/84
[58] Field of Search .............. 360/77, 84, 85, 21

[56] References Cited

U.S. PATENT DOCUMENTS 4,007,493 2/1977 Behr et al. ............. 360/77
4,184,181 1/1980 Mijatovic ............... 360/77
4,321,634 3/1982 Lehureau ............... 360/77

FOREIGN PATENT DOCUMENTS 2838003 3/1980 Fed. Rep. of Germany ....... 360/51

Primary Examiner—Vincent P. Canney
Attorney, Agent, or Firm—Lewis H. Eslinger; Alvin Sinderbrand

[57] ABSTRACT

Apparatus for simultaneously reproducing video signals having block synchronization signals and that have been recorded in successive, parallel channel tracks extending obliquely on a magnetic tape, with adjacent ones of the tracks having the video signals recorded therein with different azimuth angles, the apparatus including two magnetic heads movable in a direction along the channel tracks for reproducing the signals recorded therein; a phase detecting circuit for detecting a phase error between the block synchronization signals reproduced from adjacent ones of the tracks by the two magnetic heads; and a control circuit for controlling the relative positions between the tracks and the magnetic heads in response to the detected phase error so that the two magnetic heads accurately scan respective ones of the tracks.

7 Claims, 18 Drawing Figures

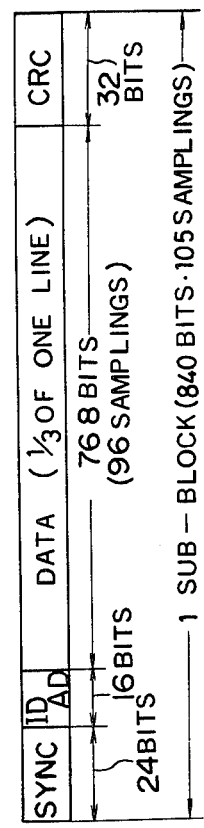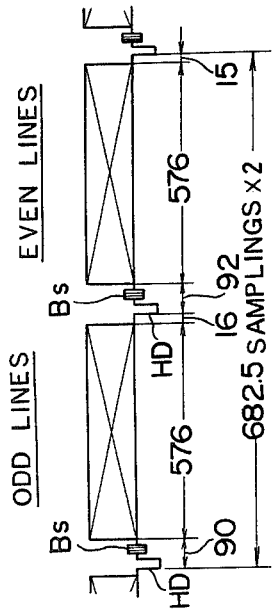

TRACKING CONTROL SYSTEM FOR MAGNETIC RECORDING AND REPRODUCING SYSTEM

This is a continuation of application Ser. No. 261,445, filed May 7, 1981.

BACKGROUND OF THE INVENTION

1. Field of the Invention

This invention relates generally to tracking control systems for magnetic recording and reproducing systems and, more particularly, is directed to a tracking control system which effects a tracking control operation on the basis of the phase of the signal reproduced from tracks recorded on a magnetic recording medium during the reproduction operation.

2. Description of the Prior Art

Generally, in a magnetic recording and reproducing system, such as a video tape recorder (hereinafter referred to as a VTR), the quality of the reproduced signal deteriorates if there is a deviation between the position of the recorded track, which is produced as the recording magnetic head traces the magnetic recording medium during the recording operation, and the position of the reproducing magnetic head as the latter traces the recording medium during the reproduction operation (hereinafter referred to as tracking error). In order to eliminate this tracking error, it is necessary to effect a tracking control operation. For example, in a VTR where the video signal is recorded and reproduced by using a rotary magnetic head assembly, the aforementioned tracking control operation may be performed as a capstan servo-control operation with respect to a capstan motor, the latter of which drives a magnetic tape at a constant speed in response to the tracking error. Another way of effecting such tracking error correction has been to provide an automatic-tracking control system which uses a wobbling or dithering signal, and in which the position of the reproducing magnetic head is controlled so as to maximize the level of the envelope of the reproduced signal, while imparting a slight vibration to the reproducing magnetic head by means of a deflector on which the head is mounted.

With the aforementioned capstan servo-control system, however, optimum reproduction of the video signal may be impossible due to deviation between the position of the control signal track and the position of the video signal track, caused by various reasons. For example, one reason for such deviation may be the result of a misalignment or mounting error which occurs when a control track recording and reproducing head is mounted in each VTR. In this manner, the aforementioned problem arises when signals are recorded with different VTRs. Another reason for such deviation may be due to the elongation or contraction of the magnetic tape due to temperature and/or mechanical variations. Further, if the recording tracks are of a curved configuration, satisfactory operation of the capstan servo-control system further results in a deterioration in the quality of the video signal reproduced. With the tracking control correction effected by use of a wobbling signal, although it is possible to substantially always correctly trace the center of the video track, the effective envelope level of the reproduced signal is reduced to about 90% by such wobbling, whereby deterioration of the overall signal-to-noise ratio inevitably results.

OBJECTS AND SUMMARY OF THE INVENTION

Accordingly, it is an object of this invention to provide a tracking control system that avoids the above-described difficulties encountered in the prior art. More particularly, it is an object of this invention to provide a tracking control system for a magnetic recording and reproducing system, which is adapted to perform an accurate tracking control operation with a high response speed without deteriorating the noise margin.

In accordance with an aspect of this invention, apparatus is provided for reproducing information signals that have been recorded in successive, parallel channel tracks on a record medium, with adjacent ones of the tracks having the information signals recorded therein with different azimuth angles, the apparatus comprising at least two reproducing magnetic heads movable in a direction along the tracks for simultaneously reproducing the information signals recorded therein; phase detecting means for detecting a phase error between information signals reproduced from adjacent ones of the tracks by the at least two magnetic heads; and control means for controlling the relative positions between the tracks and the magnetic heads in response to the detected phase error so that the magnetic heads accurately scan respective ones of the tracks.

The above, and other, objects, features and advantages of the invention, will be apparent in the following detailed description of illustrative embodiments thereof which is to be read in connection with the accompanying drawings.

BRIEF DESCRIPTION OF THE DRAWINGS

FIGS. 6, 7 and 8 are schematic diagrams to which reference will be made in explaining the digitization and code arrangement of a video signal for use in a digital VTR embodying this invention;

DETAILED DESCRIPTION OF THE PREFERRED EMBODIMENTS

Figure 1:
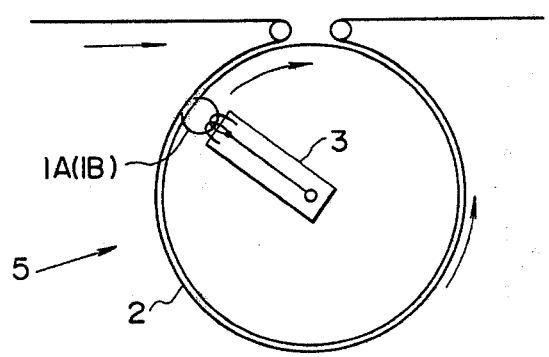
FIG. 1 is a schematic plan view of a rotary guide drum assembly for use in a tracking control system according to one embodiment of the present invention.

Referring to the drawings in detail, and initially to FIG. 1 thereof, a rotary guide drum assembly 5 is shown which is rotated at the field frequency of the video signal so as to effect recording and reproduction of an NTSC color video signal with respect to a magnetic recording tape. This rotary rotary drum assembly 5 includes two magnetic heads 1A and 1B mounted at the tip of a bimorph leaf 3, with magnetic heads 1A and 1B being rotated at a constant speed corresponding to the aforementioned field frequency by means of a rotational force inparted by a drive motor (not shown) to the stem or connected portion of bimorph leaf 3. Magnetic tape 2 is obliquely wound in a Q-shaped configuration about substantially 360° of rotary guide drum assembly 5, and it is advanced in the longitudinal direction thereof at a predetermined speed in frictional contact with magnetic heads 1A and 1B.

Figure 2:
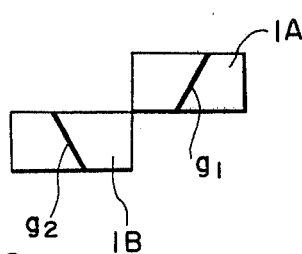
FIGS. 2 and 3 are elevational views showing respective magnetic heads that can be mounted in the rotary guide drum assembly of FIG. 1.
Figure 3:
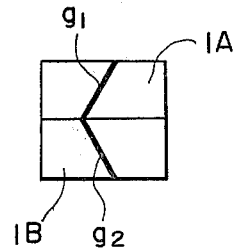

A control voltage from a tracking control circuit 50 (FIG. 12) is applied to bimorph leaf 3 to control the height of magnetic heads 1A and 1B. As shown in FIGS. 2 and 3, magnetic heads 1A and 1B have respective magnetic gaps $g_1$ and $g_2$ having different azimuth angles and are disposed in close proximity to each other.

Figure 4:
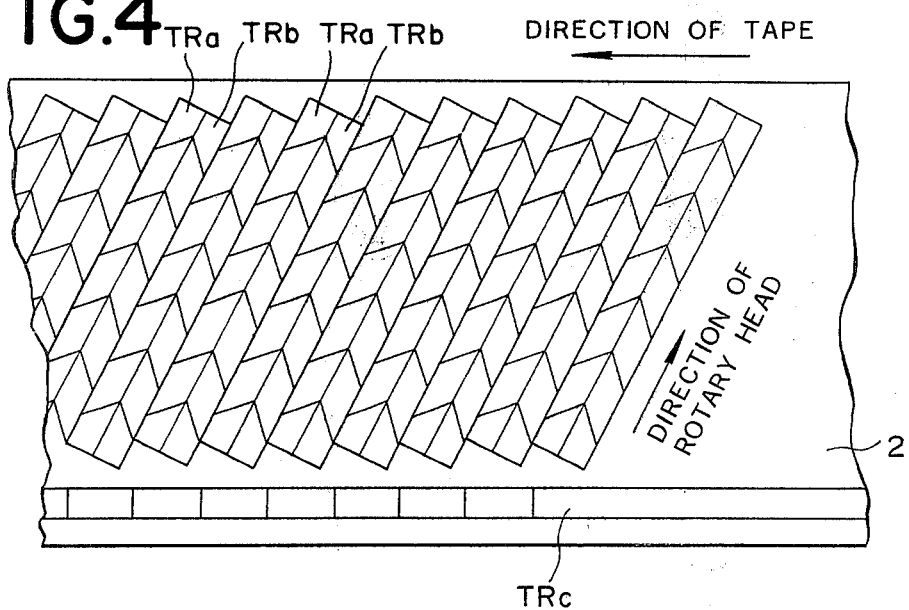
FIG. 4 is a schematic plan view of a portion of magnetic tape having a magnetic track pattern recorded by the rotary guide drum assembly of FIG. 1.

With the above arrangement, two parallel recording tracks TRa and TRb, without any guard bonds therebetween, are formed at a predetermined inclination angle with respect to the longitudinal direction of magnetic tape 2, for each field of video information. In other words, the video signal is recorded by a two-channel azimuth recording operation, with recording tracks TRa and TRb having different azimuth angles. A control track TRc is also formed in the longitudinal direction of tape 2 at the lower edge thereof, as shown in FIG. 4.

Figure 5:
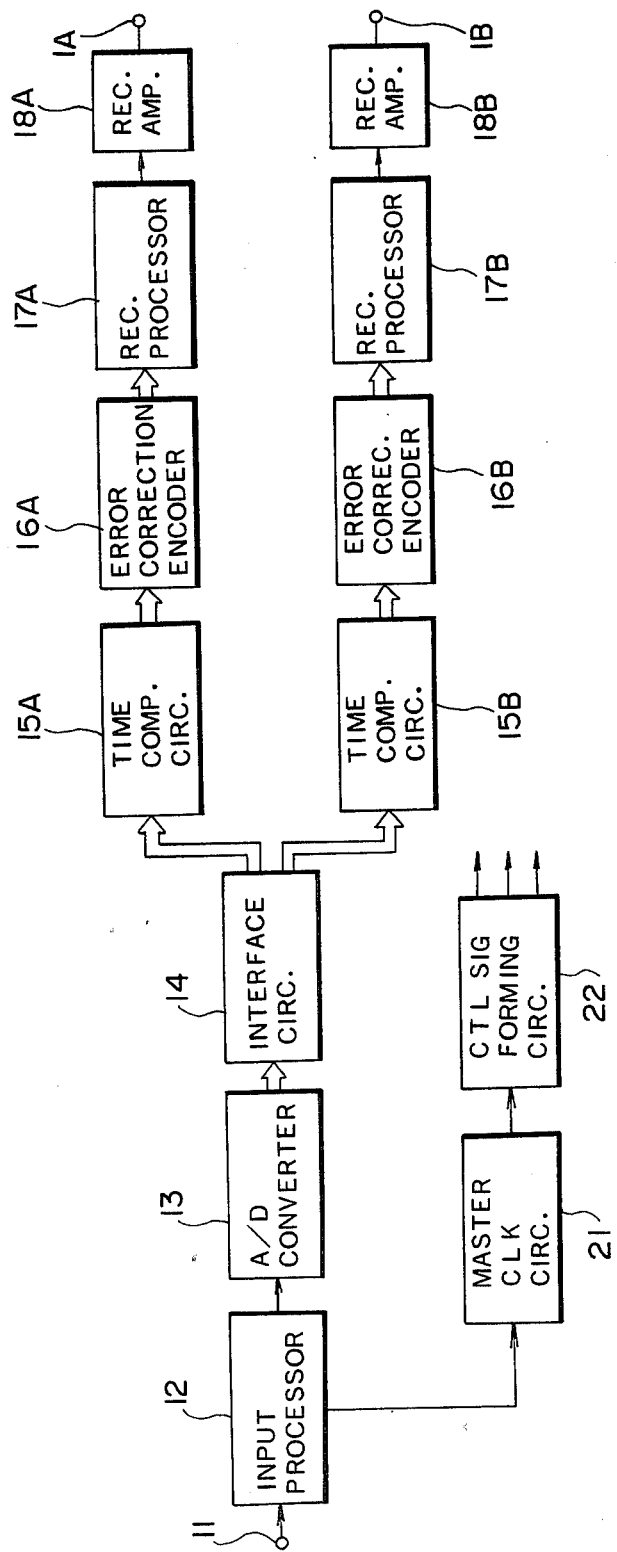
FIG. 5 is a block diagram of a recording circuit of a digital video tape recorder (VTR) embodying this invention.

The recording circuit for the VTR according to this invention, as shown in FIG. 5, includes an input processor 12 supplied with an NTSC color video signal from an input terminal 11, and the video signal output therefrom, which no longer contains the sync pulse signals and burst signal, is coupled to analog-to-digital converter 13. The sync pulse signals and burst signal which are separated in input processor 12 are supplied to a master clock formation circuit 21 which is operated in synchronism with the burst signal to form a clock pulse signal at a frequency of N (a positive integer) times the subcarrier frequency $f_c$. The clock pulse signal thus formed and also the sync pulses are supplied to a control signal forming circuit 22 which generates identification signals regarding the lines, fields, frames and tracks, a sampling pulse signal and various timing signals, these signals being supplied to respective circuits.

Analog-to-digital (A/D) converter 13 samples the color video signal under the control of the sampling pulse signal provided from control signal forming circuit 22 and converts or digitizes the sampled signal into, for instance, an 8-bit parallel digital signal (PCM signal) for each sampling.

In the instant embodiment, the aforementioned integer N is set to 3, that is, the sampling frequency is, set to $3f_c$. Since the subcarrier frequency $f_c$ is $$f_c = (455/2)f_h$$

(where $f_h$ is the horizontal scanning frequency), this means that the sampling operation is effected 682.5 times in each horizontal scanning period. However, taking into consideration that the aforementioned sampling number includes a fractional part of 0.5, that no sampling is necessary during the horizontal blanking period and that the digital signal is distributed into two channels, the number of samples for the effective video region in each horizontal scanning period is set to 576, as shown in FIG. 6. In FIG. 6, HD is a horizontal sync pulse, and BS a burst signal, these signals being shown for the sake of illustration although they are actually removed in input processor 12, as aforementioned. It is to be noted that the horizontal scanning lines in which the horizontal sync pulse HD coincides in phase with the color subcarrier are referred to as odd lines, and the lines in which the horizontal sync pulse HD is 180° out of phase with the color subcarrier are referred to as even lines. Further, while one field consists of 262.5 lines, of these lines, 10.5 lines are occupied by the vertical sync and equalization pulses. In the vertical sync section, test signals such as the VIR and VIT signals are inserted, and these signals are treated as effective data. Accordingly, each field includes 252 effective video lines, with the 12-th to 263-rd lines being included in the odd field and the 274-th to 525-nd lines being included in the even field.

While the color video signal is sampled by the analog-to-digital converter 13 on the basis of the aforementioned considerations, the 8-bit parallel digital signal obtained through digitalization for each sampling is alternately distributed through an interface circuit 14 to A and B channels. More particularly, for the 576 samples in each line, the digital signal corresponding to the odd numbered samples is supplied to an A channel time base compression circuit 15A, while the digital signal corresponding to the even numbered samples is supplied to a B channel time base compression circuit 15B, with the time base being compressed with a ratio 41/44, as will be described hereinafter. The compressed two channel digital signals are progressively coupled through error correction encoders 16A and 16B and recording processors 17A and 17B for conversion into signals of the format shown in FIGS. 7 and 8.

FIG. 7 shows the code arrangement for one field of the video signal in the A or B channel and consists of 13×22 blocks, each block consisting of three sub-blocks SB and each block containing data of one line of the color video signal. As shown in FIG. 8, each sub-block SB contains data for ⅓ of a line of the color video signal, and in the following order, includes a 24-bit block synchronization signal SYNC, a 16-bit identification signal ID and address signal AD, a 768-bits (96 samples) of data and a 32-bit CRC code. It is to be appreciated that FIG. 7 represents the blocks in matrix form for the purpose of facilitating the explanation ensuing of the error correction method.

The synchronization signal SYNC is used for extracting the identification and address signals ID and AD, the data signal and the CRC code. The identification signal ID indicates the relevant channel (track) that is, the A or B channel, and whether the relevant line, field and frame for each sub-block SB is odd or even, and the address signal AD represents the address (block number) of the relevant sub-block SB. The CRC code is used for the detection of an error in the information data of the respective sub-block during reproduction.

Since each field period includes 252 effective lines of video information, as mentioned previously, there are 252 blocks for each field, these 252 blocks being shown in a matrix array of 12×21 blocks, as shown in FIG. 7. Parity data for the horizontal direction is added in the thirteenth column, and parity data for the vertical direction is added as in the twenty-second row, whereby the entire matrix array consists of 13×22 blocks.

If the sub-blocks are denoted by $SB_1$ to $SB_{858}$, modulo-2 addition is performed in the horizontal direction, as follows, to obtain the horizontal parity data:

$$SB_1 \oplus SB_4 \oplus SB_7 \oplus \ldots \oplus SB_{34} = SB_{37'}$$

$$SB_2 \oplus SB_5 \oplus SB_8 \oplus \ldots \oplus SB_{35} = SB_{38'}$$

and $$SB_3 \oplus SB_6 \oplus SB_9 \oplus \ldots \oplus SB_{36} = SB_{39'}$$

for the first horizontal line, thus forming the horizontal parity data $SB_{37}$, $SB_{38}$ and $SB_{39}$ for the first line. The mark "$\oplus$" signifies the exclusive OR function. Horizontal parity data for the following 2-nd to 21-st rows is formed in the same manner.

Further, vertical parity data $SB_{820}$ is formed for the first column of the matrix as follows:

$$SB_1 \oplus SB_{40} \oplus SB_{79} \oplus \ldots \oplus SB_{781} = SB_{820'}$$

and vertical parity data is also formed for the 2-nd to 13-th columns in the same manner.

The horizontal and vertical parity data and CRC code data are used for the error correction operation during reproduction. Each sub-block of parity data also consists of 840 bits.

The signal processing operation for forming the parity data and CRC code data and for adding such data to the video data is carried out in encoders 16A and 16B. Also, the synchronization signal SYNC, identification signal ID and address signal AD are formed in and added to the video data in processors 17A and 17B.

In processors 17A and 17B, a block encoding operation is performed for converting the number of bits of one sample from 8 bits to 10 bits. In this block encoding step, the conversion is effected by selecting $2^8$ codes with a DSV (direct current level) equal to or substantially equal to 0 from among $2^{10}$ codes of 10-bit words, and converting the selected 8-bit code words into 10-bit codes with one-to-one correspondence to such 10-bit codes such that the DSV of the recorded signal is as close to 0 as possible, that is, "0" and "1" appear substantially uniformly. This block encoding operation is effected because of the fact that with a conventional magnetic head the DC portion cannot be reproduced during reproduction.

In processors 17A and 17B, the 10-bit code converted digital signal obtained as a result of the block encoding operation is subjected to progressive conversion from a parallel signal into a serial signal for sub-block $SB_1$. Also, preamble and postamble signals are added before and after the digital signal for each field. The bit rate of the serial signal obtained by the operation is as follows:

$$3f_c \times 8 \times \frac{1}{2} \times \frac{44}{41} \times \frac{10}{8} = 57.62 \ [Mb/s].$$

The serial digital signals are then coupled through recording amplifiers 18A and 18B to respective magnetic heads 1A and 1B of rotary guide drum assembly 5.

The rotary guide drum assembly 5 is operated such that the digital signal for the A channel is recorded as one slant track TRa for each field by head 1A, while the digital signal for the B channel is recorded as one slant track TRb parallel and contiguous to track TRa for each field by head 1B.

In this case, for each channel, a signal head is used for the recording, and a blanking period is produced during the recording operation by heads 1A and 1B. With VTRs of the SMPTE "C" type, the duration in which data can be recorded in the individual tracks TRa and TRb corresponds to about 250 horizontal scanning periods and, if redundancy and time-base compression is taken into consideration, 246 horizontal scanning periods are used for the video data.

As shown in FIGS. 7 and 8, the number of samples in each sub-block is 105 (840 bits), and each field period includes 858 sub-blocks. Thus, the number of samples for each field is $$105 \times 858 = 90090 \text{ samples}$$

From FIG. 6, $$\frac{90090}{\frac{682.5}{2}} = 264$$

it is determined that 264 horizontal scanning periods are needed for each field. This means that data for 264 horizontal scanning periods must be recorded during 246 horizontal scanning periods.

Accordingly, time base compression circuits 15A and 15B are adapted to compress the time base of the signal as follows:

$$\frac{246}{264} = \frac{41}{44}$$

Further, since the aforementioned various signals are added in successive circuits 16A,16B and 17A,17B, the period required for the addition of these signals is provided in time base compression circuits 15A and 15B.

Figure 9:
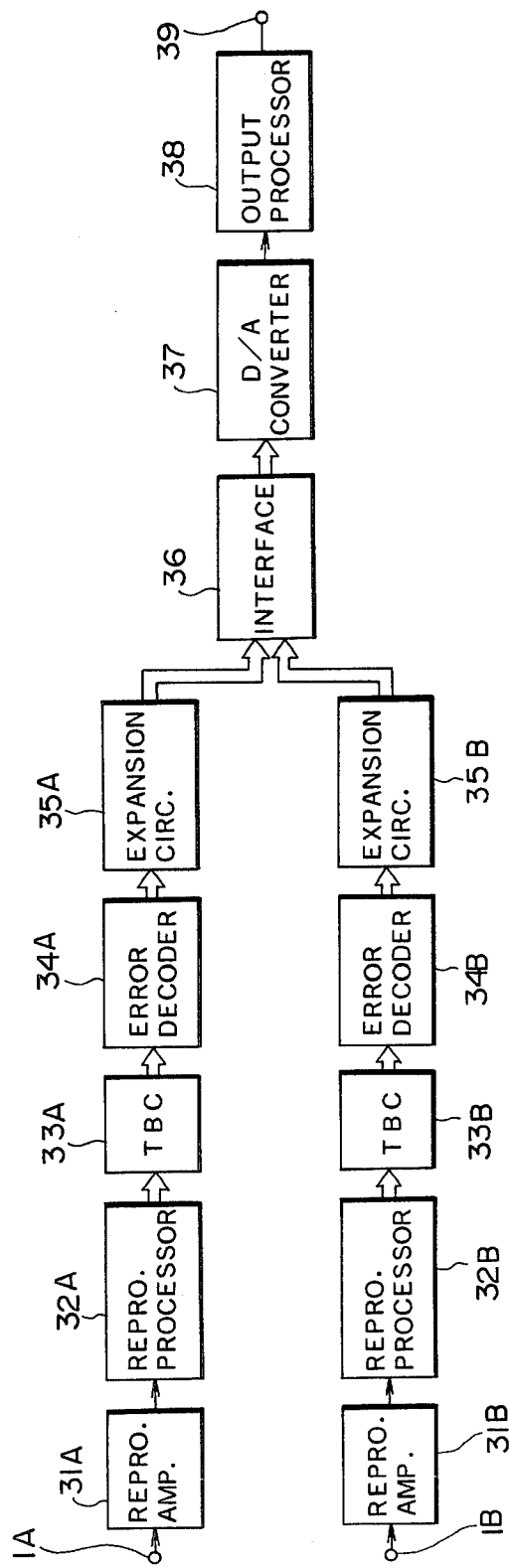
FIG. 9 is a block diagram of a reproducing circuit of a digital VTR embodying this invention.
Figure 10:
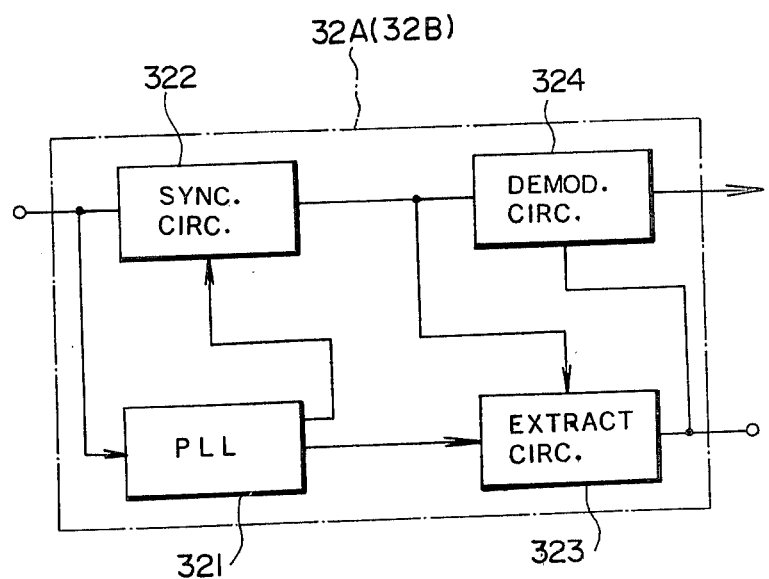
FIG. 10 is a block diagram of a reproduction processing circuit that can be used in the reproducing circuit of FIG. 9.

The color video signal that is digitally recorded as described above is reproduced in a reproducing circuit shown in FIG. 9. In this embodiment, the digital signals for the individual channels are simultaneously reproduced from tracks TRa and TRb by the respective heads 1A and 1B and are coupled through reproducing amplifiers 31A and 31B to reproducing processors 32A and 32B, respectively. The reproducing processors 32A and 32B may each be constructed as shown in FIG. 10. More particularly, each reproducing processor includes a PLL (phase-locked loop) 321 which produces a clock signal from the digital signal supplied from the reproducing amplifier 31A or 31B. The clock signal is supplied to a bit synchronization circuit 322 which synchronizes the ditial signal supplied from the reproducing amplifier 31A or 31B therewith. The synchronized signal from bit synchronization circuit 322 is then supplied, along with the output of PLL 321, to a block synchronization signal extracting circuit 323, which extracts the synchronization signal SYNC. The extracted synchronization signal SYNC is then supplied to a demodulating circuit 324, where the synchronized data from circuit 322 is converted from serial to parallel form and the 10-bit code data is block decoded to its initial 8-bit code form. The block synchronization signals SYNC obtained from the individual reproducing processors 32A and 32B are supplied to respective signal input terminals 51A and 51B of a tracking control circuit 50 (FIG. 12) which will be described hereinafter.

The parallel 8-bit digital signals thus obtained are coupled to TBCs (time base collectors) 33A and 33B for removal of the time base error components for the data. TBCs 33A and 33B each include a memory, and the block synchronization signal SYNC is used for the following heading of the signal. Also, writing of the data in the memories is effected under the control of the clock signal supplied from processors 32A and 32B, and reading from the memories is effected under the control of a clock signal formed by a local synchronizer. In this way, the time base error components are removed.

The signals from TBCs 33A and 33B are supplied to error decoders 34A and 34B, each of the latter including a field memory, and data is written into each field memory for each sub-block SB in accordance with the respective address signal AD. At this time, errors in the data are corrected for each sub-block SB according to the CRC code and horizontal and vertical parity data. If too may errors exist to be corrected by the CRC code and parity data, writing of the sub-blocks SB of data in the field memory is not effected, whereby data from the prior field is read out in place thereof.

The error corrected data that have been corrected for errors is supplied to time base expansion circuits 35A and 35B to recover the original time base data, and such circuits are, in turn, coupled to an interface 36 and synthesized therein to recover the original one channel data. Further, the digital signal thus obtained is coupled to a digital-to-analog (D/A) converter 37 to recover the analog color video signal. This analog color video signal is supplied to an output processor 38 where sync pulses and a burst signal are added, thus recovering the original color video signal, which is supplied to an output terminal 39.

Figure 11:
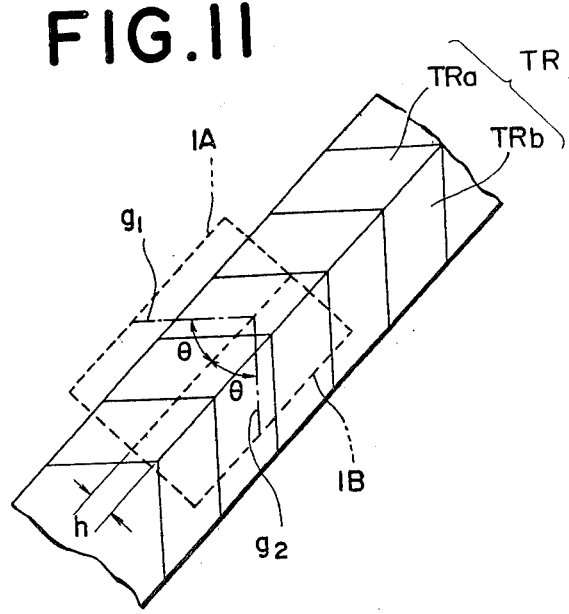
FIG. 11 is a schematic view illustrating the principles of the tracking error detection operation by the present invention.

In the instant embodiment which is provided with the recording and reproducing circuits as described above, simultaneous recording or simultaneous reproduction of the two channel digital signals is carried out by rotary guide drum assembly 5 having the two magnetic head 1A and 1B with different azimuth angles. Thus, if a tracking error exists when the tracks are traced by magnetic heads 1A and 1B during the reproduction operation, a phase difference is produced between the two channel reproduced digital signals. For example, if a tracking error h in the direction perpendicular to the recording tracks on magnetic tape 2 is produced by magnetic heads 1A and 1B, which have opposite azimuth angles $\theta$, as shown in FIG. 11, one of the signals reproduced by magnetic heads 1A and 1B is advanced, while the other is retarded by an amount d as follows:

$$d = h \tan \theta$$

and thus, a phase difference of 2d, namely, $$2d = 2h \tan \theta$$

is produced. For example, if the aximuth angle $\theta$ is equal to 7° and the tracking error is $-h = 10 \mu m$, $$2d = 20 \tan 7° = 2.46 \mu m.$$

This means that a phase difference of 2.46 $\mu m$ is produced with a tracking error of 10 $\mu m$. Where the recording is made at a rate of 50 Mbps/tracks, for instance, the aforementioned phase difference corresponds to a time interval of about 5 clock pulses, since one wavelength is approximately 1 $\mu m$ (0.5 $\mu m$ in the case of a clock signal having a frequency of 50 MHz). If it is intended to detect the aforementioned phase difference directly by using the aforementioned clock signal, there is apt to be a loss in the stability of the tracking control operation because of the generation of multiple stability points.

Accordingly, with the present invention, the tracking errors for the tracking control operation are detected by detection of the phase difference of the block synchronization signals SYNC between the individual channels, which synchronization signals are present in the digitally recorded signal in each channel at intervals determined by dividing each horizontal scanning period (1H) into two or three sections (about 20 $\mu m$).

Figure 12:
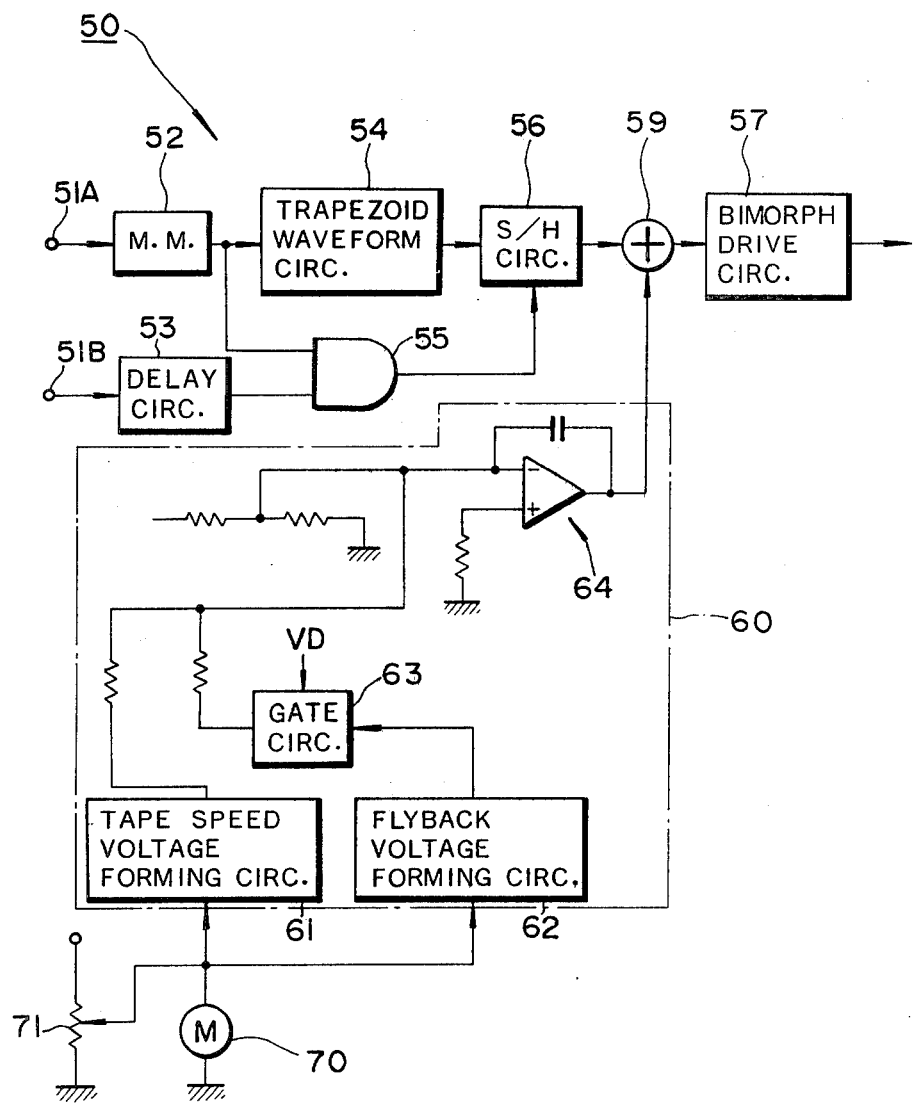
FIG. 12 is a block diagram the construction of a tracking control circuit according to one embodiment of this invention.
Figure 13:
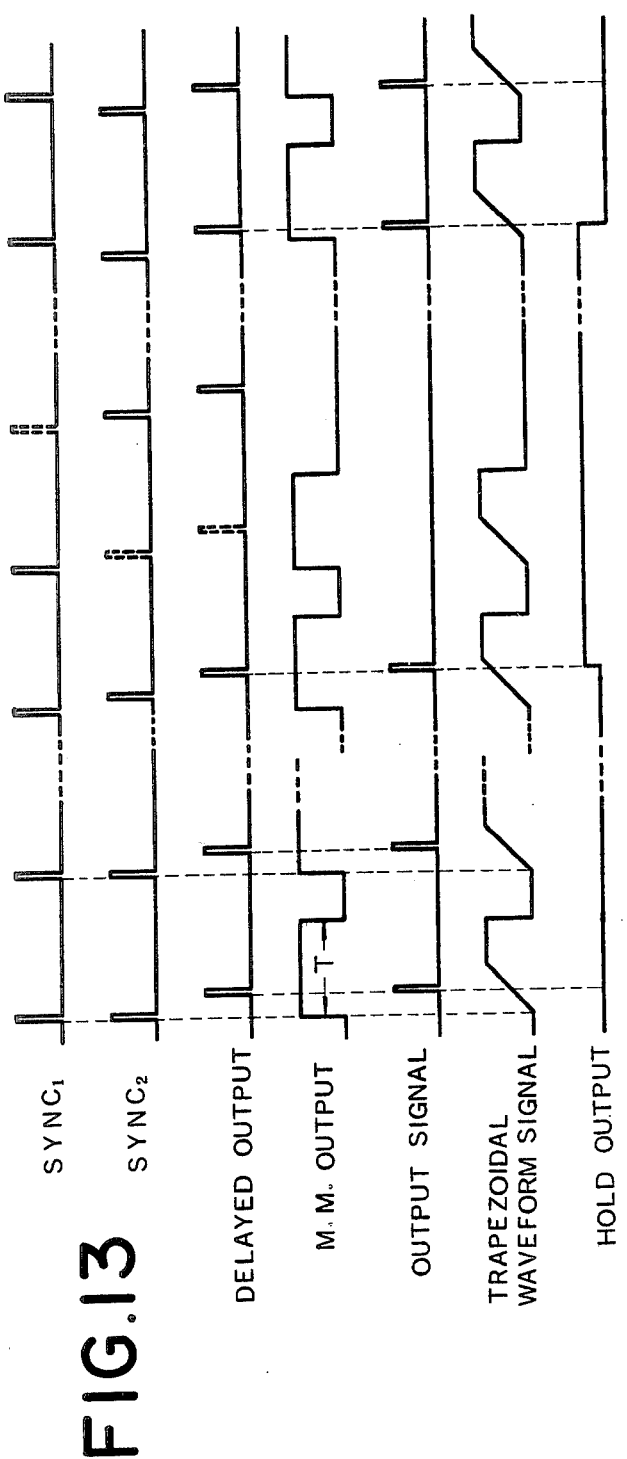
FIG. 13 are waveform diagrams used for illustrating the operation of the tracking control circuit shown in FIG. 12.

More particularly, the present invention includes a tracking control circuit 50, as shown in FIG. 12, for controlling the tracing position of magnetic heads 1A and 1B by applying a control voltage to bimorph leaf 3 of the rotary guide drum assembly 5 during reproduction by the aforementioned reproducing circuit. In tracking control circuit 50, the block synchronization signals SYNC 1 and SYNC 2 from reproducing processors 32A and 32B of the reproducing circuit are supplied through input terminals 51A and 51B to a mono-stable multi-vibrator 52 and a delay circuit 53, respectively. The mono-stable multi-vibrator 52 is triggered at the leading edge of block syncyhronization signal SYNC I to produce a pulse signal having a predetermined duration T, which pulse signal is supplied to a trapezoidal wave forming circuit 54 and one input of an AND gate 55. AND gate 55 is enabled by the pulse signal from multivibrator 52 to pass block synchronization signal SYNC 2, as delayed by delay circuit 53, to a sample/hold circuit 56. The trapezoidal waveform forming circuit 54 forms a trapezoidal waveform signal which rises in synchronism with the leading edge of the pulse signal from mono-stable multivibrator 52, and this trapezoidal waveform signal is supplied to sample/hold circuit 56. The sample/hold circuit 56 samples and holds the leading edge ramp voltage of the trapezoidal waveform signal in accordance with the output signal from AND gate 55, and supplies a hold voltage $V_h$ corresponding to the phase difference between the individual block synchronization signals $SYNC_1$ and $SYNC_2$ from each channel to a bimorph leaf drive circuit 57. The phase comparison by sample/hold circuit 56 is effected in synchronism with the output signal from AND gate 55. In this manner if a drop-out of the signal is detected, hold voltage $V_h$ is maintained at the value held immediately before the dropped-out block synchronization signal, as shown by the dashed line in FIG. 13. Since bimorph leaf drive circuit 57 is controlled according to hold voltage $V_h$ obtained from the aforementioned sample/hold circuit 56 in the manner as described above, bimorph leaf 3 carrying magnetic heads 1A and 1B functions to vary the position of magnetic heads 1A and 1B so as to eliminate the tracking error. FIG. 13 shows the waveforms of various signals mentioned above.

Figure 14:
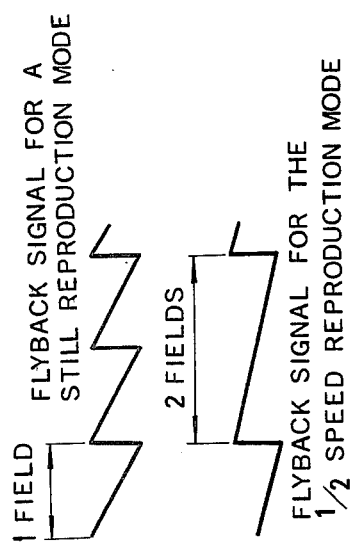
FIG. 14 is a waveform diagram illustrating ramp waveform signals used in the tracking control circuit of FIG. 12 during reproduction in special reproducing modes.

Further, in order to effect a tracking control operation in non-normal reproducing modes that is, those other than the ordinary reproducing mode, for example, in a still-motion reproduction mode or in a motion reproduction mode, tracking control circuit 50 superimposes a ramp waveform signal, as shown in FIG. 14, upon hold voltage $V_h$ from sample/hold circuit 56. More particularly, and referring to FIG. 12, hold voltage $V_h$ from sample/hold circuit 56 is added in an adder 59 with a ramp waveform signal from a ramp wave generator 60 and the combined signal is supplied to bimorph leaf drive circuit 57.

The ramp wave generator 60 includes a tape speed voltage forming circuit 61 for setting the slope of the ramp waveform signal in accordance with the operating mode of the system, a flyback voltage forming circuit 62 for forming a flyback signal at a frequency corresponding to the operating mode, a gate circuit 63 and an integrating circuit 64 for generating the ramp waveform signal. Tape speed voltage forming circuit 61 and flyback voltage forming circuit 62 are controlled in accordance with the drive voltage applied to a motor 70 for advancing magnetic tape 2. The drive voltage applied to drive motor 70 is set in accordance with the operating mode of drive motor 70. The flyback voltage forming circuit 62 supplies a flyback signal corresponding to the aforementioned drive voltage, that is, the operating mode, and for example, is synchronized to occur once for every field in the case of the still-motion reproduction mode and for each two fields in case of ½ speed reproduction mode' through the gate circuit 63 to the integrating circuit 64. The vertical synchronization signal VD is also supplied to gate circuit 63.

It is to be appreciated that, while in the above embodiment, the tracking error is detected from the phase difference of the block synchronization signals in the reproduced digital signal that is obtained with a digital VTR, it is also possible to detect the tracking error from the phase information contained in the reproduced signal with a conventional analog VTR by arranging simultaneous recording or simultaneous reproduction with different azimuth angles for at least two channel recording tracks. Further, the phase detection may also be obtained with various phase detectors other than the charge ramp integration type phase detecting circuit, as in the above embodiment.

As has been made apparent from the embodiment described above, with the tracking control system for the magnetic recording and reproducing system according to the present invention in which simultaneous recording or simultaneous reproduction with respect to a plurality of tracks having different azimuth angles on a magnetic recording medium occurs, the tape tracking control operation is effected through the detection of the tracking error from the phase difference of the individual channel reproduced signals obtained during reproduction, so as to obtain stable and accurate tracking control with high, response speed and without sacrifice in the noise margin.

Figure 15:
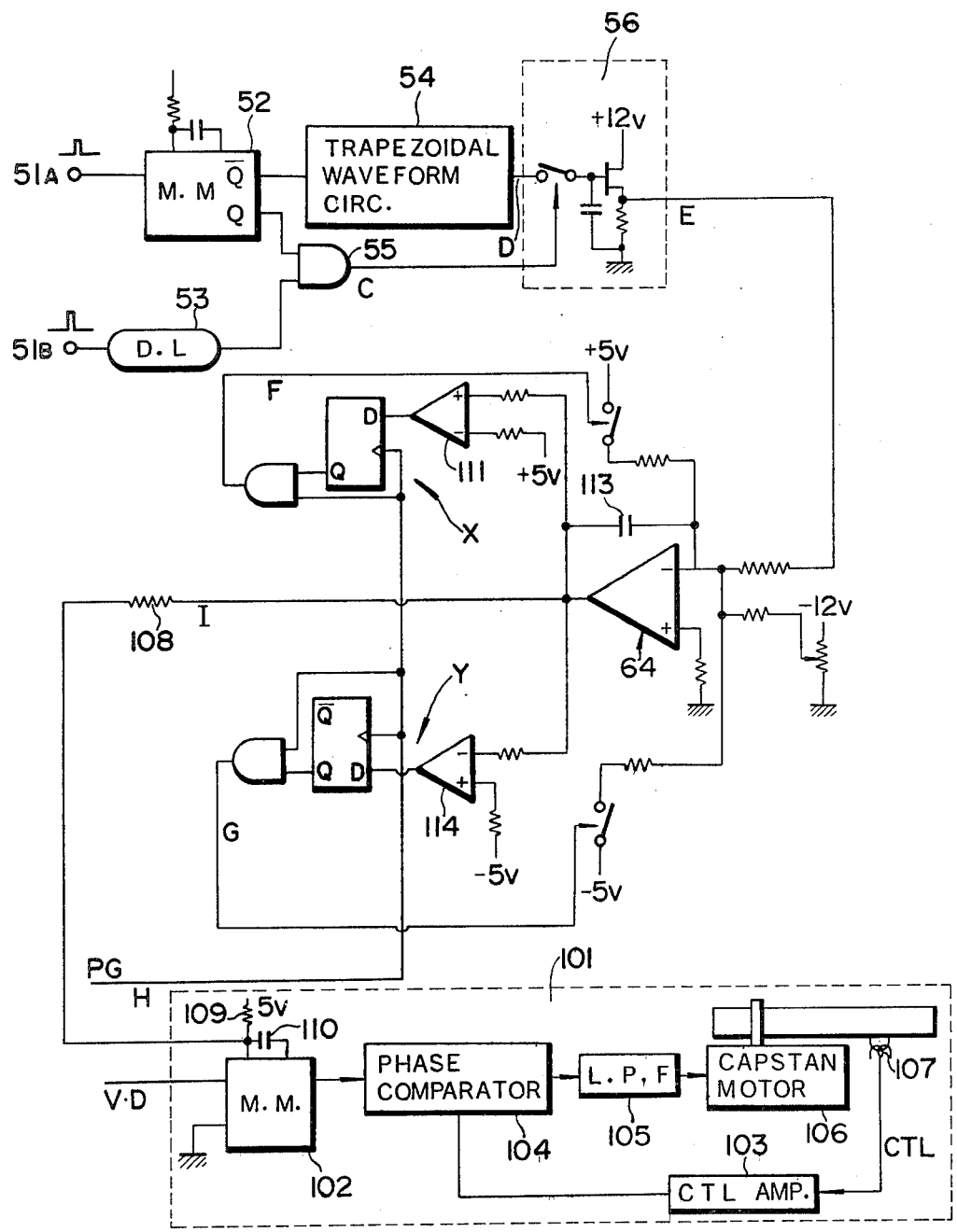
FIG. 15 is a block diagram of a tracking control circuit according to another embodiment of this invention.

Referring now to FIG. 15, another embodiment of a tracking control circuit according to this invention will now be described, with elements corresponding to those described above with reference to the circuit of FIG. 12 being identified by the same reference numerals, and with a detailed description of such corresponding elements being omitted for the sake of brevity. As shown therein, a conventional capstan servo circuit includes a mono-stable multivibrator 102 to which the vertical synchronization signal VD obtained from the reproduced signal is supplied, a CTL amplifier 103 for amplifying the reproduced control signal from a CTL head 107, and a phase comparator 104 for comparing the phase of the output of CTL amplifier 103 and the phase of the output of multivibrator 102. The output of phase comparator 104 is supplied through a LPF (low-pass filter) 105 to a capstan motor 106 for controlling the rotation thereof. The phase comparator 104, although not shown in detail, has the same construction as the aforementioned trapezoidal wave forming circuit 54 and sample/hold circuit 56 when combined.

As with the preceding embodiment, the control voltage generated from integrating circuit 64 is supplied through a resistor 108, shown in FIG. 15, to the juncture between a resistor 109 and a capacitor 110 which determine the time constant of mono-stable multivibrator 102. Thus, capstan control circuit 101 controls the tape position such that a signal corresponding to the average tracking error between the two magnetic heads is added to the phase difference between the CTL signal and the reproduced vertical synchronization signal VD. Thus, it is possible to obtain steady tracking even in the case where a conventional capstan servo system cannot follow the error. In particular, where signals are recorded as digital signals, this system, which effects an averaging control operation, results in a low signal-to-noise ratio.

Figure 16:
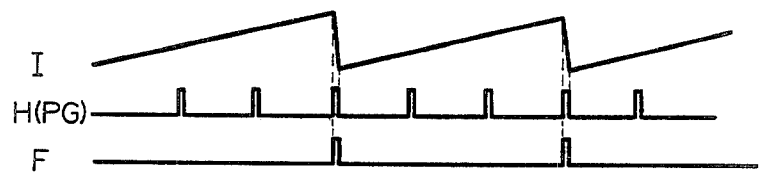
FIGS. 16 and 17 are waveform diagrams used for illustrating the operation of the tracking control circuit of FIG. 15.
Figure 17:
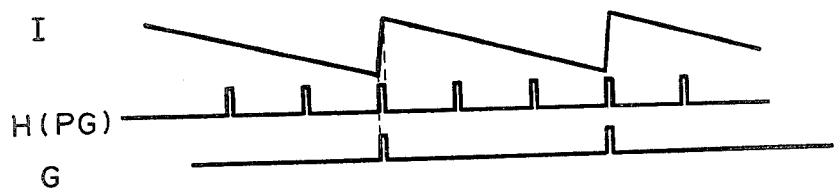

With the tracking control circuit of the illustrated embodiment of FIG. 15, if tracking deviation takes place at a reduced or increased tape speed so that the block synchronization signal can no longer be reproduced, the output of integrator 64 is maintained at a plus or minus maximum value. In such case, tracking can no longer be effected, even after normal tape speed is subsequently resumed. Accordingly, X and Y circuits are provided in the tracking control circuit of FIG. 15, so that when the integrator output I has a positive slope, an operational amplifier 111 of the X circuit detects a voltage above +5 V, as shown in FIG. 16, for discharging a capacitor 113 associated with integrator 64 in synchronism with the pulse output of the pulse generator used for rotation of the rotary guide drum assembly. On the other hand, when integrator output I has a negative slope, an operational amplifier 114 of the Y circuit detects a voltage below −5 V for discharging capacitor 113 in synchronism with the pulse generator output. With this arrangement, the output of integrator 64 will not assume any extreme value, so that tracking can be readily effected when reproduction of the block synchronization signals resumes.

Figure 18:
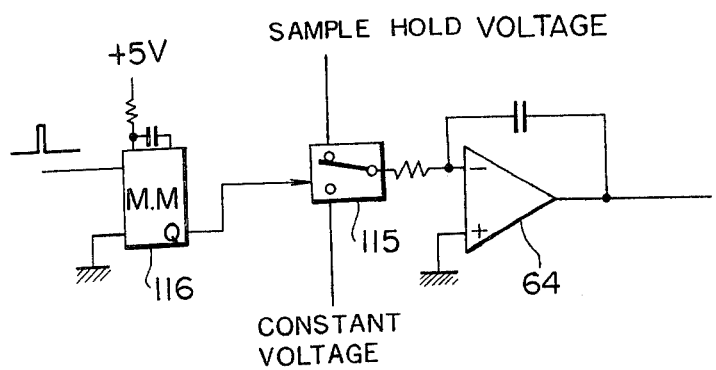
FIG. 18 is a block diagram of a modification of a portion of the tracking control circuit of FIG. 15.

In this tracking control circuit, when the block synchronization signals are not reproduced, the slope of the output of integrator 64 is determined by the output of sample/hold circuit 56. In such case, however, the time until the tracking operation resumes after the normal tape speed is resumed is likely to be extended. A circuit shown in FIG. 18 is adapted to prevent such extension of time and includes a selection switch 115 connected between sample/hold circuit 56 and integrator 64 and which is controlled by a mono-stable multivibrator 116. The block synchronization signal $SYNC_1$ or $SYNC_2$, or delayed output signal, as shown in FIG. 13, is supplied to mono-stable multivibrator 116, so that when the block synchronization signals are reproduced, the Q output mono-stable multivibrator 116 rises to cause selection switch 115 to supply the output of sample/hold circuit to integrator 64. When the block synchronization signals are not reproduced, a constant voltage is applied through selection switch 115 to integrator 64. Thus, a constant slope is always provided. When the constant speed is resumed, the servo operation can immediately resume.

By selecting the time constant of mono-stable multivibrator 116 to correspond to several block synchronization signals, selection switch 115 can be maintained without being switched to the constant voltage side even if a guard band is partly scanned by the rotary magnetic heads.

While either the block synchronization signal $SYNC_1$ or $SYNC_2$, or delayed output, is supplied to mono-stable multivibrator 116, it is advantageous to select the delayed output since it always corresponds to the sample hold signal produced.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. Apparatus for reproducing digital information signals, which include block synchronization signals utilized for converting said digital information signals to analog signals, that have been recorded in successive, parallel channel tracks extending obliquely on a magnetic tape, with adjacent ones of said tracks having the digital information signals recorded therein with different azimuth angles, the apparatus comprising:
at least two reproducing magnetic heads simultaneously movable in a direction along said tracks for simultaneously reproducing said digital information signals recorded therein, said at least two magnetic heads having different azimuth gaps, respectively;
phase locked loop means for forming at least one clock signal in response to said reproduced digital information signals;
means for extracting said block synchronization signals from said reproduced digital information signals in response to said at least one clock signal;
phase detecting means for detecting a phase error between said extracted block synchronization signals reproduced from adjacent ones of said tracks by said at least two magnetic heads; and
control means for controlling the relative positions between said tracks and said magnetic heads in response to said detected phase error so that said magnetic heads accurately scan respective ones of said tracks.

2. Apparatus according to claim 1; wherein said digital information signals are split into first and second channels and there are two magnetic heads, each of which reproduces the digital information signals of a respective channel; and wherein said phase locked loop means includes a first phase locked loop circuit for forming a first clock signal from said reproduced digital information signals of said first channel, and a second phase locked loop circuit for forming a second clock signal from said reproduced digital information signals of said second channel; said means for extracting includes a first extracting circuit for extracting said block synchronization signals from said reproduced digital information signals of said first channel in response to said first clock signal, and a second extracting circuit for extracting said block synchronization signals from said reproduced digital information signals of said second channel in response to said second clock signal; and further including means for supplying said extracted block synchronization signals to said phase detecting means.

3. Apparatus according to claim 2; wherein said phase detecting means is formed by sample/hold circuit means.

4. Apparatus according to claim 3; wherein said phase detecting means includes monostable multivibrator means for producing an output in response to said block synchronization signals extracted from said reproduced digital information signals of said first channel, trapezoidal wave forming means for supplying a trapezoidal output signal to said sample/hold circuit means in response to said output of said monostable multivibrator means, delay means for producing a delayed output in response to said block synchronization signals extracted from said reproduced digital information signals of said second channel, AND gate means for supplying an output to said sample/hold circuit means in response to said output from said monostable multivibrator means and said delay output.

5. Apparatus according to claim 3; wherein said phase detecting means further includes integration means for producing an integrated output in response to an output from said sample/hold circuit means, and means for substituting a constant voltage signal to said integration means in place of the output from said sample/hold circuit means when there is a temporary loss of said block synchronization signals.

6. Apparatus according to claim 5; wherein said means for substituting a constant voltage includes switch means controlled by the output of a monostable multivibrator to which said extracted block synchronization signals are supplied.

7. Apparatus according to claim 1; further comprising head deflection means for deflecting said at least two magnetic heads in a direction perpendicular to the longitudinal direction of said tracks in response to said control means.

* * * * *